United States Patent
Kato

(10) Patent No.: US 7,925,745 B2
(45) Date of Patent: Apr. 12, 2011

(54) MONITORING APPARATUS, EXECUTIVE PROGRAM, AND INFORMATION PROCESSING SYSTEM

(75) Inventor: Kosuke Kato, Fujisawa (JP)

(73) Assignee: Fujitsu Limited, Kawasaki (JP)

( * ) Notice: Subject to any disclaimer, the term of this patent is extended or adjusted under 35 U.S.C. 154(b) by 11 days.

(21) Appl. No.: 12/230,412

(22) Filed: Aug. 28, 2008

(65) Prior Publication Data

US 2009/0013075 A1    Jan. 8, 2009

(51) Int. Cl.
*G06F 15/173* (2006.01)
(52) U.S. Cl. .......................... 709/224; 714/48
(58) Field of Classification Search .............. 714/45, 714/5, 48; 718/100; 347/171; 709/224
See application file for complete search history.

(56) References Cited

U.S. PATENT DOCUMENTS

| | | | |
|---|---|---|---|
| 2001/0011358 A1* | 8/2001 | Ochiai | 714/45 |
| 2002/0051050 A1* | 5/2002 | Hachinoda | 347/171 |
| 2004/0194107 A1* | 9/2004 | Masuoka | 718/100 |
| 2006/0031711 A1* | 2/2006 | Yokokura | 714/5 |

FOREIGN PATENT DOCUMENTS

| | | |
|---|---|---|
| JP | 2-297228 | 12/1990 |
| JP | 4-369067 | 12/1992 |
| JP | 7-162420 | 6/1995 |
| JP | 10-283230 | 10/1998 |
| JP | 2002-229816 | 8/2002 |
| JP | 2002-366396 | 12/2002 |
| JP | 2003-15912 | 1/2003 |

OTHER PUBLICATIONS

URL:http://primeserver.fujitsu.com/primepower/news/article/05/0111/.
Translation of the International Preliminary Report on Patentability, mailed Sep. 12, 2008, issued in corresponding International Application No. PCT/JP2006/303724.
International Search Report mailed Jun. 6, 2006, issued in corresponding International Application No. PCT/JP2006/303724.

* cited by examiner

*Primary Examiner* — Jungwon Chang
(74) *Attorney, Agent, or Firm* — Staas & Halsey LLP

(57) ABSTRACT

The present invention has: a data deriving section 610 that derives from an information processing apparatus having a management function for the client-server system state data representative of an apparatus state of the information processing apparatus, when the data deriving section receives a notification of occurrence of a breakdown by the information processing apparatus; a breakdown classification section 620 that classifies breakdown associated with the notification into a breakdown type corresponding to a seriousness of breakdown, of two or more breakdown types that are mutually different in seriousness of breakdown; and a data storage section 630 that stores the state data derived from the data deriving section 610 in a storage area corresponding to the breakdown type classified by the breakdown classification section, of two or more storage areas associated with said two or more breakdown types, respectively.

6 Claims, 13 Drawing Sheets

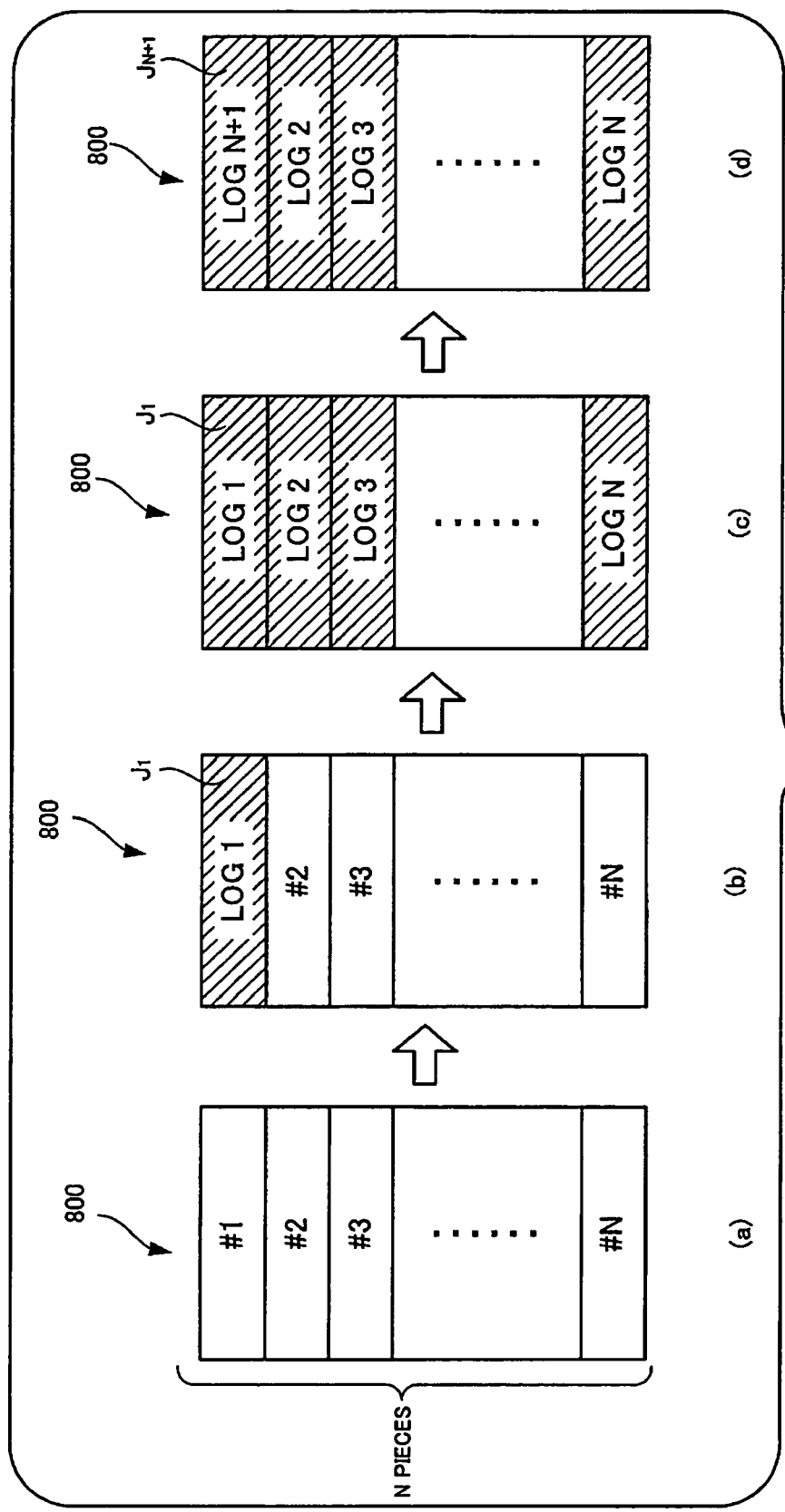

MONITORING APPARATUS, EXECUTIVE PROGRAM, AND INFORMATION PROCESSING SYSTEM

TECHNICAL FIELD

The present invention relates to a monitoring apparatus that monitors operations of an information processing apparatus, an executive program that causes a computer to operate as the monitoring apparatus, and an information processing system comprising an information processing apparatus and a monitoring apparatus that monitors operations of the information processing apparatus.

BACKGROUND ART

As ones which are offered in recent years to the market as a server that manages a client-server system in its entirety on a generalizing basis, there is known a server system in which an information processing apparatus having a server function and a monitoring apparatus that always observes the state of the information processing apparatus are installed in one case (refer to non-patent document 1, for instance).

According to the server system as mentioned above, when the breakdown occurs in the machine, the information processing apparatus notifies the monitoring apparatus installed in the server system of the breakdown generation. Upon receipt of the notification, the monitoring apparatus gathers various types of sub-data representative of the operation states of individual section in the information processing apparatus when the breakdown occurs for instance, through access to individual section in the information processing apparatus. Then the monitoring apparatus stores two or more sets of sub-data thus gathered in a predetermined storage area of the monitoring apparatus in form of state data representative of the state of the information processing apparatus at the time when the breakdown occurs.

The information processing apparatus is often designed so as to continuously operate even if the breakdown occurs in the machine, in order to manage the client-server system as continuously as possible. When the breakdown occurs two or more times on the information processing apparatus, the monitoring apparatus gathers and stores the state data from the information processing apparatus whenever the breakdown occurs. And, the state data stored by that time is analyzed at regular maintenance etc. At that time, for instance, when the part in the state that causes the significant drop of the processing performance and the down of the server is found, treatment such as the repair of the part or the exchanges with the new article is taken.

Incidentally, hitherto, regarding the storage of the state data of the monitoring apparatus as mentioned above, a simple storage method, which will be described exemplarily hereinafter, is often adopted.

FIG. 13 is a view useful for understanding an example of a conventional storage method for the state data of the monitoring apparatus.

An storage area 800 shown in FIG. 13 is divided into the division of N pieces of the mutually same size, in which individual one state data is stored.

The number is applied to individual division like #1, #2, #3, . . . , #N. The state data, which is gathered in the monitoring apparatus whenever the breakdown generates, is sequentially stored from the division corresponding to a young number in order. Moreover, at that time, the serial number is applied to the state data like log 1, log 2, log 3, . . . , log N.

Part (a) of FIG. 13 shows the state that all divisions have become empty. Part (b) of FIG. 13 shows the state that only one division is occupied with a piece of state data. Part (c) of FIG. 13 shows the state that all divisions of store N pieces of state data. Part (d) of FIG. 13 shows the state that the state data of piece N+1 is stored following the state shown in part (c) of FIG. 13. As seen from part (d) of FIG. 13, state data $J_{n+1}$ of piece N+1 gathered exceeding N piece that is the number of maximum storage of the storage area 800 is overwritten in state data $J_1$ of piece first. Similarly, state data of piece N+2 is overwritten in state data of piece second, and state data of piece N+3 is overwritten in state data of piece third.

[Non-patent document 1] Internet<URL:http://primerserver-.fujitsu.com/primepower/news/article/05/0111/on "High trust and solution that PRIMEPOWER (registered trademark) and PRIMECLUSTER (registered trademark) weave high available" online and Jan. 11, 2005, FUJITSU Ltd. and retrieval on Feb. 1, 2006.

According to the storage method of requiring the overwrite of data as mentioned above, the state data gathered in relation to the breakdown that causes the significant drop in the processing performance and the down of the server may be lost by overwrite with the state data gathered afterwards. Thus, when maintaining it, such a serious breakdown might be overlooked.

In order to suppress the occurrence such a situation so as to improve the precision of the discovery of the breakdown at the time of maintenance etc, for instance, there is considered such a method of suppressing the frequency of the overwrite by preparing a mass storage area which is provided with the division as mentioned above as a lot as possible. However, a preparation of such mass storage area brings about problems such as rise of cost and an increase in installation space, etc.

Though there is explained the problem that the breakdown might be overlooked here raising by way of example the monitoring apparatus that observes the operation of the information processing apparatus that has the server function in the client-server system, such a problem may be generally caused when the state data obtained from some information processing apparatus is stored in a memory, but not restricted to the client-server system.

In view of the foregoing, it is an object of the present invention to provide a monitoring apparatus capable of discovering the breakdown on an information processing apparatus with greater accuracy, an executive program that causes a computer to operate as the monitoring apparatus, and an information processing system capable of discovering the breakdown on an information processing apparatus with greater accuracy.

DISCLOSURE OF THE INVENTION

To achieve the above-mentioned object, the present invention provides a monitoring apparatus that monitors operations of an information processing apparatus that notifies occurrence of breakdown which occurs during execution of a predetermined information processing operation, the monitoring apparatus comprising:

a data deriving section that derives from the information processing apparatus state data representative of an apparatus state of the information processing apparatus, when the data deriving section receives a notification of occurrence of a breakdown by the information processing apparatus;

a breakdown classification section that classifies the breakdown associated with the notification into a breakdown type corresponding to a seriousness of the breakdown, of two or more breakdown types that are mutually different in seriousness of breakdown; and a data storage section that stores the state data derived by the data deriving section in a storage area corresponding to the breakdown type classified by the breakdown classification section, of two or more storage areas associated with the two or more breakdown types, respectively.

Some of the breakdowns which occurs in the above-mentioned information processing apparatus may cause great decrease in processing performance and server down, and there is a breakdown low in seriousness wherein it involves little substantial damage, and the failure analysis is omitted because it is almost clear as for the cause, as well as a breakdown high in seriousness which needs a detailed failure analysis when maintaining it. And, generally, there is frequent such a case that occurrence frequency of the breakdown which is high in seriousness is low as compared with occurrence frequency of the breakdown which is low in seriousness. According to the monitoring apparatus of the present invention, the state data that is many in number and is high in frequency of overwriting, which is obtained on the breakdown which is low in seriousness, is stored in a storage area different from a storage area for a state data obtained on the breakdown that is high in seriousness, which is desired to avoid the superscription as much as possible. This feature makes it possible to enhance protection ability of the state data which are obtained on the breakdown of the serious breakdown type. Thus, according to the present invention, it is possible to discover with the greater accuracy the breakdown of the information processing apparatus in accordance with such state data when the maintenance and the like are performed in the future.

In the monitoring apparatus of the present invention as mentioned above, it is preferable that the data deriving section derives from the information processing apparatus a set of sub-data each representing a component state of two or more components constituting the information processing apparatus respectively, as the state data, and the data storage section stores each of the sub-data constituting the state data in a storage section corresponding to each datum size of the sub-data, of two or more storage sections each associated with data sizes different from one another in the storage area, when the data storage section stores the state data in the storage area.

According to the monitoring apparatus of the present invention as mentioned above, the storage area can be effectively used in accordance with the data size of the sub-data. This feature makes it possible to suppress the generation of a useless unused area in the storage area, so that the area of the storage area can be made the best use of enough. Consequently, it is possible to store the above-mentioned sub-data as a lot as possible and thus to store the above-mentioned state data as a lot as possible. As a result, the frequency of the superscription generation in the storage area is suppressed, and thus the protection for the state data in the storage area can be improved further.

In the monitoring apparatus of the present invention as mentioned above, it is preferable that the data deriving section derives from the information processing apparatus a set of sub-data each representing a component state of two or more components constituting the information processing apparatus respectively, as the state data, and the data storage section stores each of the sub-data constituting the state data in a storage section corresponding to each datum size of the sub-data, of two or more storage sections each associated with data sizes different from one another in the storage area, when the data storage section stores the state data in the storage area, and wherein the monitoring apparatus further comprises an alteration section that alters a maximum storage number of the sub-data in the storage section by altering an area of the storage section to an area according to an operation.

According to the monitoring apparatus of the present invention as mentioned above, for instance, the alteration section expands an area of a desired storage section, so that the maximum storage number of the sub-data in the storage section is increased. This feature makes it possible to suppress the frequency of the superscription generation in the storage area, so that the protection for the sub-data in the storage area can be improved.

To achieve the above-mentioned object, the present invention provides a computer-readable storage medium storing a monitoring program that is incorporated in a computer to be executed in the computer, the monitoring program causing the computer to monitor operations of an information processing apparatus that notifies occurrence of breakdown which occurs during execution of a predetermined information processing operation, wherein the monitoring program constitutes in the computer:

a data deriving section that derives from the information processing apparatus state data representative of an apparatus state of the information processing apparatus, when the data deriving section receives a notification of occurrence of a breakdown by the information processing apparatus;

a breakdown classification section that classifies the breakdown associated with the notification into a breakdown type corresponding to a seriousness of the breakdown, of two or more breakdown types that are mutually different in seriousness of breakdown; and a data storage section that stores the state data derived from the data deriving section in a storage area corresponding to the breakdown type classified by the breakdown classification section, of two or more storage areas associated with the two or more breakdown types, respectively.

According to the executive program of the present invention, it is possible to easily implement a monitoring apparatus capable of discovering the breakdown of the information processing apparatus with the greater accuracy.

To achieve the above-mentioned object, the present invention provides an information processing system comprising:

an information processing apparatus that notifies occurrence of breakdown which occurs during execution of a predetermined information processing operation; and a monitoring apparatus including:

a data deriving section that derives from the information processing apparatus state data representative of an apparatus state of the information processing apparatus, when the data deriving section receives a notification of occurrence of a breakdown by the information processing apparatus;

a breakdown classification section that classifies the breakdown associated with the notification into a breakdown type corresponding to a seriousness of the breakdown, of two or more breakdown types that are mutually different in seriousness of breakdown; and a data storage section that stores the state data derived from the data deriving section in a storage area corresponding to the breakdown type classified by the breakdown classification section, of two or more storage areas associated with the two or more breakdown types, respectively.

According to the information processing system of the present invention, it is possible to discover the breakdown of the information processing apparatus with the greater accuracy.

With respect to the executive program of the present invention and the information processing system of the present invention, only the basic aspects are disclosed here. It is noted, however, that the executive program of the present invention and the information processing system of the present invention include not only the basic aspects, but also various aspects corresponding to the above-mentioned aspects of the monitoring apparatus of the present invention as mentioned above.

According to the present invention, it is possible to provide a monitoring apparatus capable of discovering the breakdown of the information processing apparatus with the greater accuracy, an executive program which causes a computer to operate as such a monitoring apparatus, and an information processing system capable of discovering the breakdown of the information processing apparatus with the greater accuracy.

BRIEF DESCRIPTION OF THE DRAWINGS

FIG. 13 is a view useful for understanding an example of a conventional storage method for the state data of the monitoring apparatus.

BEST MODE FOR CARRYING OUT THE INVENTION

Hereinafter, there will be described the embodiments of the present invention in conjunction with the drawings.

Figure 1:
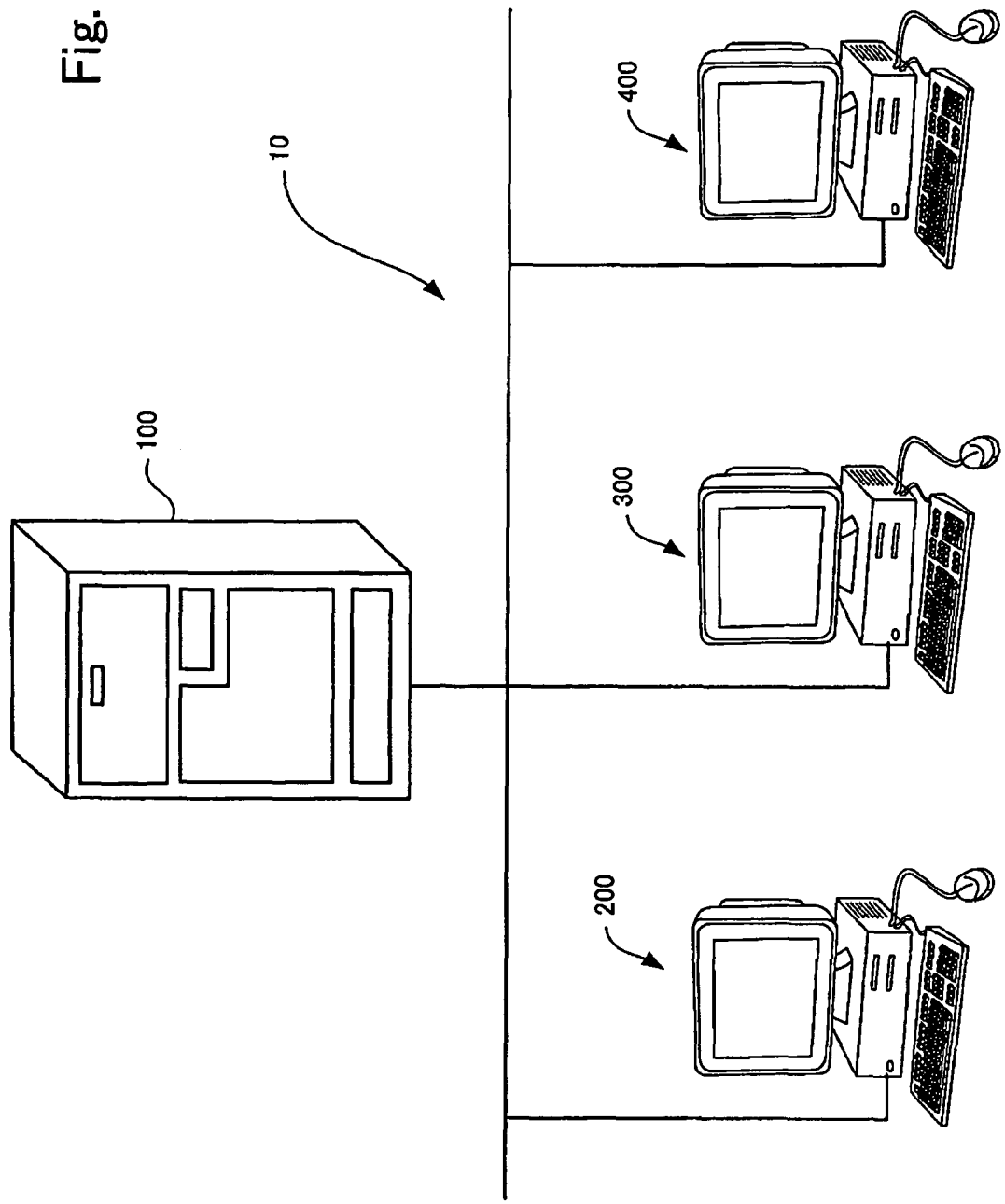
FIG. 1 is a view showing an example of a client-server system including an embodiment of the present invention.

FIG. 1 is a view showing an example of a client-server system including an embodiment of the present invention.

A client-server system 10 shown in FIG. 1 is composed of a server system 100, and two or more client computers 200, 300, 400, . . . .

The server system 100 operates as a server that manages the client-server system 10 in its entirety, and corresponds to one embodiment of the information processing system referred to the present invention.

Figure 2:
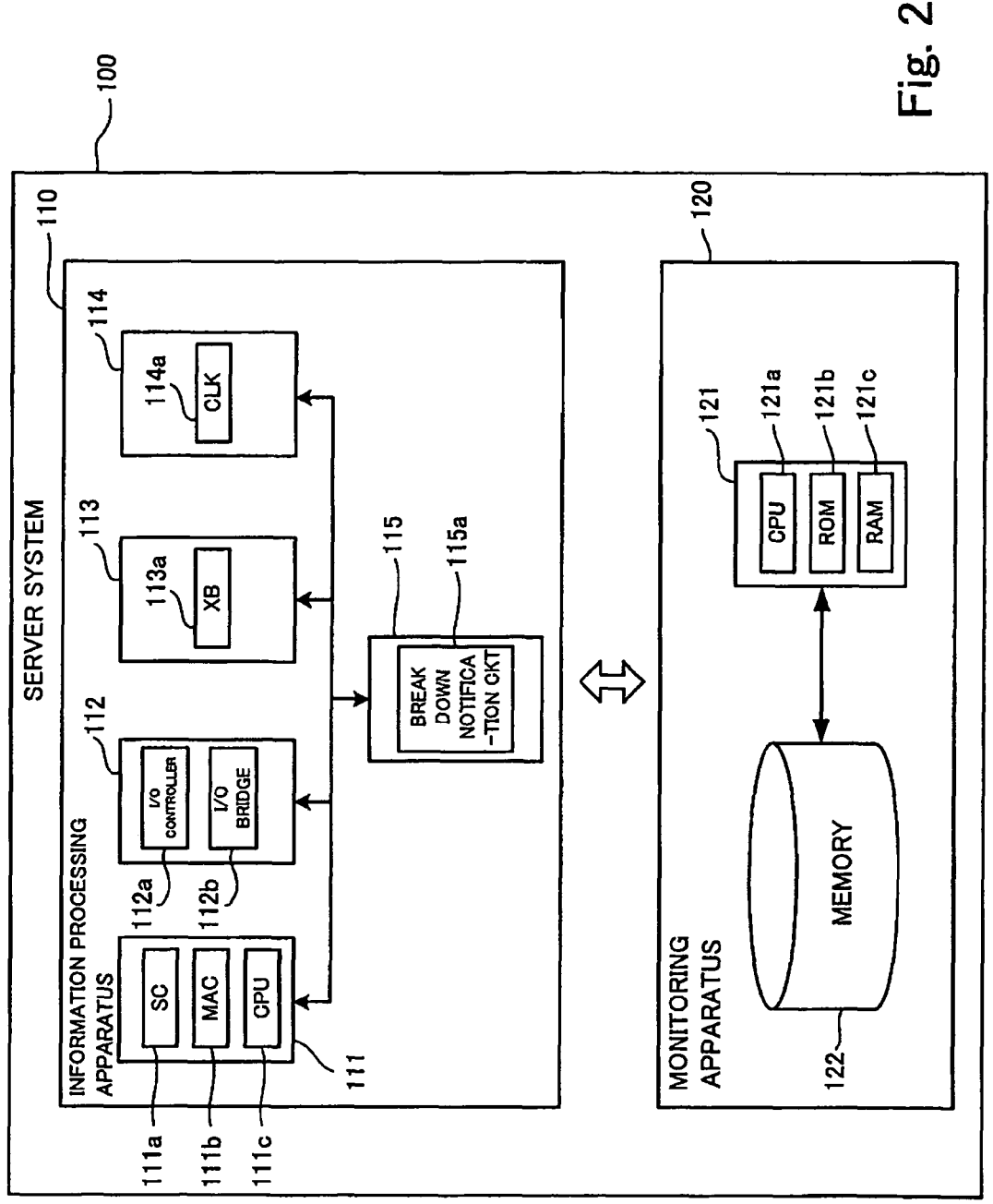
FIG. 2 is a typical illustration showing a hardware structure of a server system 100.

FIG. 2 is a typical illustration showing a hardware structure of a server system 100.

As shown in FIG. 2, the server system 100 is equipped with an information processing apparatus 110 that executes various management for the client-server system 10, and substantially serves as a server of the client-server system 10, and a monitoring apparatus 120 that monitors operations of the information processing apparatus 110. The information processing apparatus 110 corresponds to an embodiment of the information processing apparatus referred to in the present invention. The monitoring apparatus 120 corresponds to an embodiment of the monitoring apparatus referred to in the present invention.

The information processing apparatus 110 has five sorts of boards 111, 112, 113, 114 and 115.

The first board 111 is equipped with three sorts of LSI such as a system controller (SC) 111a, a memory access controller (MAC) 111b, and a central processing unit (CPU) 111c.

The SC 111a is LSI that mediates data between the CPU 111c and other parts, and implements the transfer of smooth data. The MAC 111b is LSI that controls read and write operations for data to a memory (not illustrated) of the information processing apparatus 110. The CPU 111c is LSI that controls the operation of the information processing apparatus 110 in its entirety.

The second board 112 is equipped with two sorts of LSI such as an I/O controller 112a, and an I/O bridge 112b.

The I/O controller 112a is LSI that executes the transfer of data between the information processing apparatus 110 and the exterior. The I/O bridge 112b is LSI that applies a mutual conversion between a parallel format and a serial format to a data format of data which is an object of the transfer to be executed by the I/O controller 112a.

The third board 113 is equipped with LSI such as a crossbar (XB) 113a. The fourth board 114 is equipped with LSI such as a clock generation element (CLK) 114a.

The XB 113a is LSI that mediates data between the SC 111a and the I/O controller 112a, and implements the transfer of smooth data. The CLK 114a is LSI that generates a reference clock which is used on a common basis for operation of the information processing apparatus 110 and is applied to individual portions of the information processing apparatus 110.

The fifth board 115 is equipped with a breakdown notification circuit 115a that executes the following breakdown notifications for the monitoring apparatus 120.

Here, in the server system 100 shown in FIG. 2, the monitoring apparatus 120 is deeply related to the subject of the present invention, and FIG. 2 chiefly shows, on the information processing apparatus 110, the above-mentioned LSI's which are objects for monitor with the monitoring apparatus 120, and the above-mentioned breakdown notification circuit 115a, and an illustration is omitted regarding other parts and the circuits of the information processor 110.

The monitoring apparatus 120 has a processing board 121, which is equipped with CPU 121a, ROM 121b, and RAM 121c, and a memory 122.

The processing board 121 substantially has a function of monitoring the above-mentioned LSI's. The memory 122 stores a result of the monitoring by the processing board 121.

The ROM 121b, which is loaded on the processing board 121, stores an executive program of the present invention. The CPU 121a, which is loaded on the processing board 121, operates in accordance with the program stored in the ROM 121b, so that the monitoring function is implemented.

Figure 3:
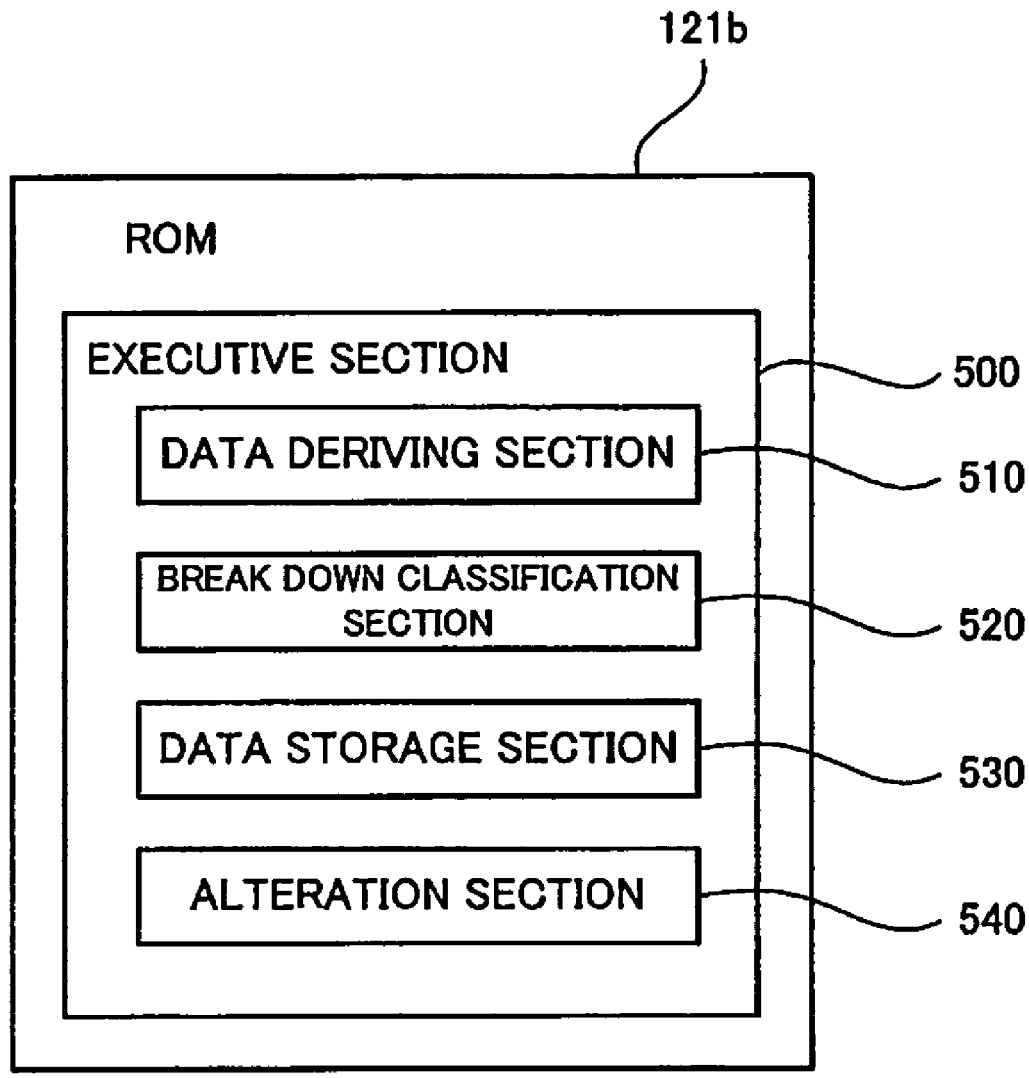
FIG. 3 is a conceptual view showing ROM 121b that stores an embodiment of an executive program of the present invention.

FIG. 3 is a conceptual view showing the ROM 121b that stores an embodiment of an executive program of the present invention.

An executive program 500 according to one embodiment of the executive program of the present invention, which is shown in FIG. 3, is composed of a data deriving section 510, a breakdown classification section 520, a data storage section 530, and an alteration section 540.

When the monitoring apparatus 120 shown in FIG. 2 turns on, the executive program 500 shown in FIG. 3 is properly developed on the RAM 121c, and the CPU 121a executes the executive program 500 developed on the RAM 121c. Thus, the above-mentioned function of the monitoring apparatus 120 is implemented. Details of the effect of individual elements of the executive program 500 will be described later.

Figure 4:
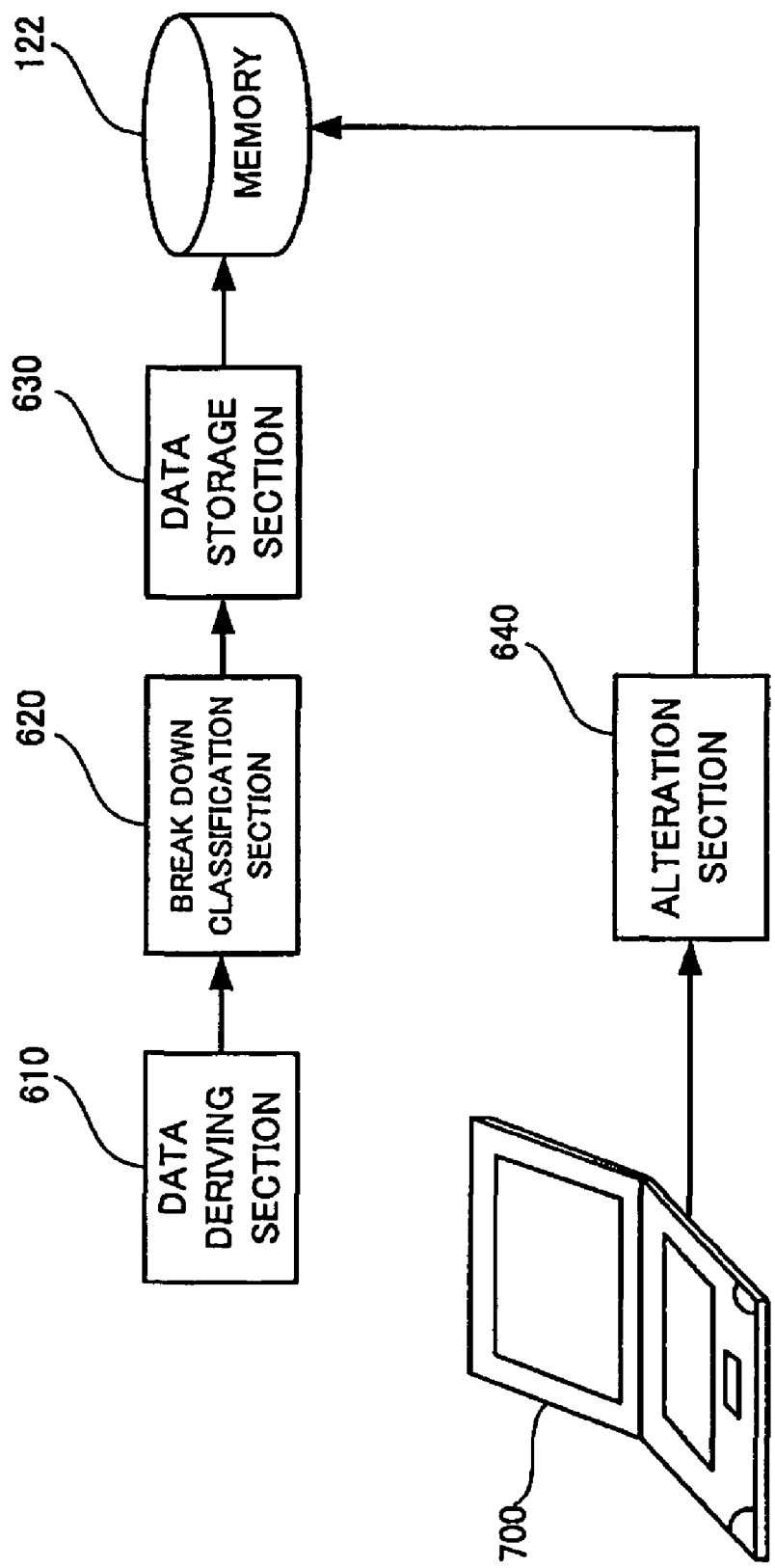
FIG. 4 is a functional block diagram useful for understanding a function of a monitoring apparatus 120 which is implemented when CPU 121a executes an executive program 500 shown in FIG. 3.

FIG. 4 is a functional block diagram useful for understanding a function of the monitoring apparatus 120 which is implemented when CPU 121a executes the executive program 500 shown in FIG. 3.

As shown in FIG. 4, the function of the monitoring apparatus 120 is composed of functional blocks of a data deriving section 610, a breakdown classification section 620, a data storage section 630, and an alteration section 640. When the CPU 121a of the monitoring apparatus 120 shown in FIG. 2 executes the executive program 500 shown in FIG. 3, the data deriving section 510, the breakdown classification section 520, the data storage section 530, and the alteration section 540, which constitute the executive program 500, construct the data deriving section 610, the breakdown classification section 620, the data storage section 630, and the alteration section 640, respectively, which are shown in FIG. 4.

Here, the data deriving section 610, the breakdown classification section 620, the data storage section 630, and the alteration section 640, which are shown in FIG. 4, correspond to the data deriving section, the breakdown classification section, the data storage section, and the alteration section, respectively, which are referred to in the present invention.

Hereinafter, there will be explained individual functional blocks of the monitoring apparatus 120 shown in FIG. 4, and individual elements of the executive program 500 shown in FIG. 3 as well.

First, there will be explained the outline of each element.

When the data deriving section 610 shown in FIG. 4 receives a notification of occurrence of the breakdown in the information processing apparatus 110, which is generated from the breakdown notification circuit 115a shown in FIG. 2, the state data representative of the state of the information processing apparatus 110 is derived from the information processing apparatus 110. The state data consists of sub-data representative of operational states of individual LSI's each internally generated in the associated LSI. The deriving of the state data is performed in such a way that the data deriving section 610 suitably gathers the sub-data from individual LSI's shown in FIG. 2.

The breakdown classification section 620 classifies the breakdown that occurs in the information processing apparatus 110 into a type corresponding to a seriousness of the breakdown, of two breakdown types that are mutually different in seriousness of the breakdown between a serious breakdown type that causes a serious drop of processing performance and a down of the server and a negligible breakdown type with little in a substantial damage.

The data storage section 630 stores the state data derived by the data deriving section 610 in storage areas of the memory 122 associated with the breakdown type classified by the breakdown classification section 620. The storage area is subdivided to two or more storage sections corresponding to a mutually different data size. When the data storage section 630 stores the state data, two or more sub-data constituting the state data are stored in the storage sections of the storage area, each associated with the data size of the sub-data, respectively.

The alteration section 640 alters the number of maximum storage of sub-data in a desired storage section among two or more store sections by changing the size of the desired storage section by the user's operation. According to the present embodiment, the alteration of the size is performed through the user's operation for terminal equipment that is electrically connected to the server system 100 shown in FIG. 1 and FIG. 2. FIG. 4 shows the state that a personal computer 700 of the note type is connected with the alteration section 640 of the monitoring apparatus 120 via the server system 100.

Next, there will be explained in detail about the monitoring apparatus 120 paying attention to the flow of the processing executed with the monitoring apparatus 120.

In the following explanations, it refers without especially noting drawing number for the components shown in each figure from FIG. 1 to FIG. 4.

Figure 5:
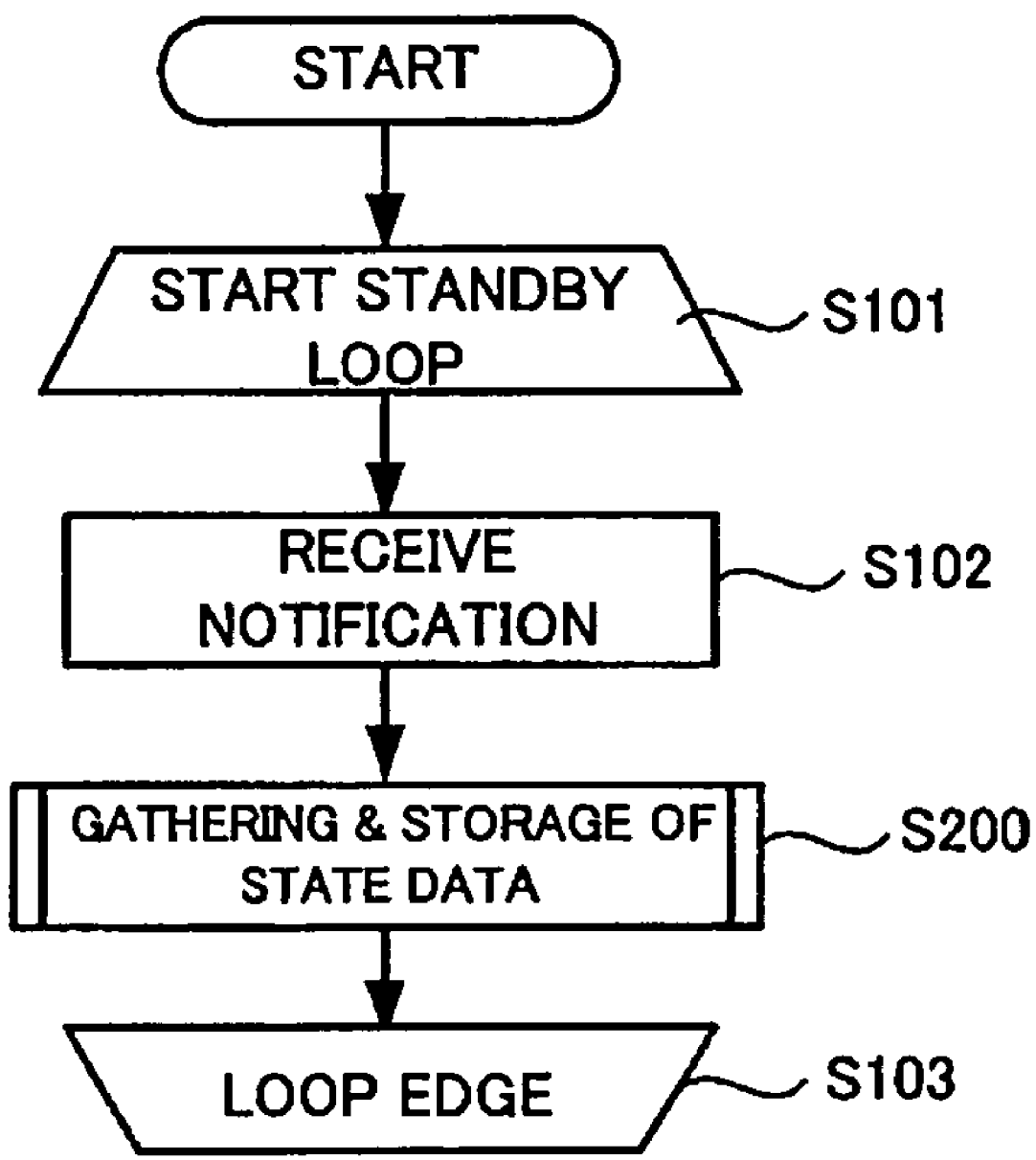
FIG. 5 is a flowchart of a main routine in processing of gathering and storage of the state data, which is to be executed by the monitoring apparatus 120.

FIG. 5 is a flowchart of a main routine in processing of gathering and storage of the state data, which is to be executed by the monitoring apparatus 120.

The main routine shown in FIG. 5 starts when a power source of the monitoring apparatus 120 turns on. When the processing starts, a standby loop (step S101) that waits for the notification of the breakdown generation by the breakdown notification circuit 115a of the information processing apparatus 110 begins. Until receiving notification of the breakdown generation from the breakdown notification circuit 115a, the following step S102 and step S200 are omitted and the processing returns to the step S101 through a loop edge (step S103).

When the breakdown generation is notified from the breakdown notification circuit 115a, the notification is received with the monitoring apparatus 120 (step S102). Next, in the step S200, the sub-routine for gathering and storage of the state data is carried out by the data deriving section 610, the breakdown classification section 620, and the data storage section 630. When the sub-routine terminates, the processing returns to the step S101 through the loop edge (step S103).

According to this main routine, the above-mentioned processing continues until the power source of the monitoring apparatus 120 turns off.

Next, there will be explained the sub-routine (step S200) for performing gathering and storage of the state data.

Figure 6:
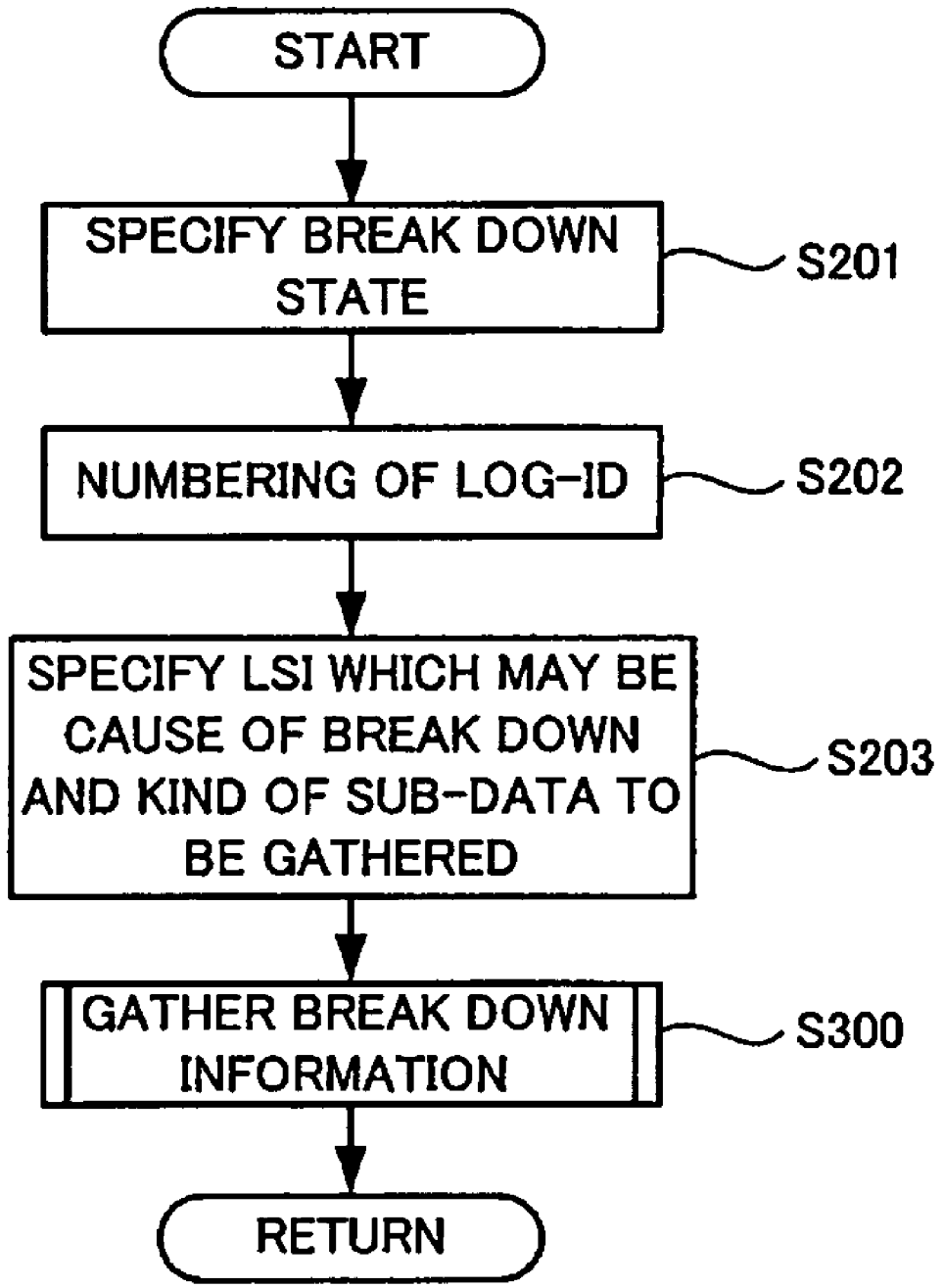
FIG. 6 is a flowchart of a subroutine which performs gathering and storage of the state data.

FIG. 6 is a flowchart of a subroutine which performs gathering and storage of the state data.

When this subroutine starts, first of all, the data deriving section 610 accesses the breakdown notification circuit 115a, so that it is specified what breakdown (state of the breakdown) is concerned with the breakdown of the notification this time (step S201). In the information processing apparatus 110, each LSI to be observed has a function of detecting in detail abnormality caused self-internally and notifying the breakdown notification circuit 115a of the abnormality. The breakdown notification circuit 115a overall analyzes the notification of abnormality where each LSI originates, and judges whether the information processing apparatus 110 is out of order as the device. Further the breakdown notification circuit 115a recognizes the state of breakdown what type of breakdown the breakdown is concerned with, and describes the recognized state of breakdown into the memory of the breakdown notification circuit 115a. In the step S201, the breakdown state of this breakdown is specified from the content of the description of the memory of the breakdown notification circuit 115a.

Next, serial number (LOG-ID) is numbered for this notification (step S202). This LOG-ID will be described later in detail.

According to the present embodiment, deriving of the state data from the information processing apparatus 110 is performed as mentioned above in such a way that the data deriving section 610 suitably gathers sub-data from individual LSI. Here, it is previously examined as to which LSI mainly causes the breakdown among seven kinds of LSI shown in FIG. 2 for each breakdown of a variety of breakdowns generated in the information processing apparatus 110. Two or more kinds of sub-data which are internally generated in each LSI exist as described later. Further, in order to indicate individual breakdown state, it is previously examined as to what kinds of sub-data are needed from the LSI of the cause of breakdown. According to the present embodiment, there are prepared the following tables where such a result of review is summarized.

Table 1 is a table where the association among individual LSI, various types of breakdown states caused by individual LSI, and kinds of sub-data to be gathered to indicate the breakdown states is shown as to the breakdown of a serious breakdown type (serious breakdown type) that is high in seriousness. Table 2 is a table where the association similar to Table 1 is shown as to the breakdown of a negligible breakdown type (negligible breakdown type) that is low in seriousness.

TABLE 1

| NAMES OF LSI | BREAKDOWN STATE | J1 Major | J2 Minor | J3 Allscan | J4 History | J5 Config | J6 Analyze |
|---|---|---|---|---|---|---|---|
| CPU | Fatal Error detected | O | O | O | O | X | O |
| | Clock stop detected | O | O | O | O | X | O |
| | Hard machine check log request | O | O | X | O | X | O |
| SC | CD Error | O | X | X | X | X | O |
| | Fatal0 | X | X | O | O | O | O |
| | Fatal1 | X | X | O | O | O | O |
| | Fatal2 Face | X | X | X | O | O | O |
| | Major Common | O | O | O | O | O | O |
| | Major Face | O | O | O | O | O | O |
| | Major CPU Absolute | O | O | O | O | O | O |
| | Major CPU Relative | O | O | O | O | O | O |
| | Major IO | O | O | O | O | O | O |
| | Major MAC | O | O | O | O | O | O |
| MAC | BANK DIMM Uncorrectable Error | O | O | X | X | X | O |
| | CD Error | O | O | X | X | O | O |
| | Common Major Error | O | O | O | O | O | O |
| | Common Major NF Error | O | O | X | X | X | O |
| | BANK Major Error | O | O | O | O | O | O |
| | BANK Major NF Error | O | O | X | X | X | O |
| I/O controller | LSI Fatal Error | O | O | X | X | X | O |
| | UBUS Fatal Error | O | O | X | X | X | O |
| | Core Fatal Error | O | O | X | X | X | O |
| | Core Major Error | O | O | X | X | X | O |
| I/O bridge | Fatal Error | O | O | X | X | X | O |
| | Major Error | O | O | X | X | X | O |
| XB | CD Error | X | X | X | X | O | O |
| | Common Major | O | O | X | X | O | O |
| | SB-Major-F0 | O | O | X | X | O | O |
| | SB-Major-F1 | O | O | X | X | O | O |
| | IOB-Major | O | O | X | X | O | O |
| CLK | Major Error | O | O | X | X | O | O |
| | SYSCD Error | O | O | X | X | O | O |
| | CLKU connect down | O | O | X | X | O | O |
| | XBU connect down | O | O | X | X | O | O |
| | CMU connect down | O | O | X | X | O | O |

TABLE 2

| NAMES OF LSI | BREAKDOWN STATE | J1 Major | J2 Minor | J3 Allscan | J4 History | J5 Config | J6 Analyze |
|---|---|---|---|---|---|---|---|
| CPU | Soft machine check log request | X | O | X | X | X | O |
| | Way Degradation log request | X | X | X | X | X | O |
| SC | Minor Common | X | O | X | X | X | O |
| | Minor Face | X | O | X | X | X | O |
| | Minor CPU Absolute | X | O | X | X | X | O |
| | Minor CPU Relative | X | O | X | X | X | O |
| | Minor IO | X | O | X | X | X | O |
| | Minor MAC | X | O | X | X | X | O |
| MAC | BANK DIMM Correctable Error | X | O | X | X | X | O |
| | BANK Static Error | X | O | X | X | X | O |
| | Common Minor Error | X | O | X | X | X | O |
| | Common Minor Error | X | O | X | X | X | O |
| | BANK Minor NF Error | X | O | X | X | X | O |
| I/O controller | UBUS Minor Error | X | O | X | X | X | O |
| | Core Minor Error | X | O | X | X | X | O |
| I/O bridge | Minor Error | X | O | X | X | X | O |
| XB | Common Minor | X | O | X | X | X | O |
| | SB-Minor | X | O | X | X | X | O |
| | IOB-Minor | X | O | X | X | X | O |
| CLK | NO CORRESPONDENCE | — | — | — | — | — | — |

From Table 1 it is understood, regarding the breakdown state E1 of the serious breakdown type, for instance, "CD Error", that LSI, which may be a cause of the breakdown, is concerned with the above-mentioned SC 111a, MAC 111b, and XB 113a. Similarly, from Table 2 it is understood, regarding the breakdown state E2 of the negligible breakdown type, for instance, "Minor Face", that LSI, which may be a cause of the breakdown, is concerned with SC 111a.

Kinds of sub-data to be gathered to indicate the breakdown states are also specified by referring to this table.

For instance, the above-mentioned individual LSI internally generates and stores six kinds of sub-data like Major information J1, Minor information J2, Allscan information J3, History information J4, Config information J5, and Analyze information J6, which are shown in Table 1 and Table 2, as sub-data that indicates the operation of the self. The six kinds of sub-data shown in Table 1 and Table 2 correspond to the sub-data referred to in the present invention, respectively.

Major information J1 is sub-data which indicate the presence of abnormality as to the main parts of two or more minute parts that compose LSI. Minor information J2 is sub-data which indicate the presence of abnormality as to parts of the remainder with a relatively low importance of two or more minute parts that compose LSI. Allscan information J3 is sub-data which indicate what processing is executed by the LSI when abnormality is generated in the LSI. History information J4 is sub-data that indicate the operation history for a certain period until abnormal generating in the LSI. Config information J5 is sub-data that indicate high/low state in prescribed part of LSI at the time when abnormality is generated in the LSI. Moreover, Analyze information J6 is a flag set at the time when abnormality is generated in the LSI.

According to the present embodiment, of those six kinds of sub-data, kinds of sub-data to be gathered from individual LSI on various types of breakdown states are determined as shown in Table 1 and Table 2. In Table 1 and Table 2, as to the various types of breakdown states, the sub-data that should be gathered is expressed by a mark "o", and the sub-data not gathered is expressed by a mark "x".

From Table 1, it is understood, as to breakdown state E1 of "CD Error", for instance, that it is necessary to gather Major information J1 and Analyze information J6 from SC 111a, to gather Major information J1, Minor information J2, Config information J5, and Analyze information J6 from MAC 111b, and to gather Config information J5 and Analyze information J6 from XB 113a. From Table 2, it is understood, as to breakdown state E2 of "Minor Face", that it is necessary to gather Major information J2 and Analyze information J6 from SC 111a.

The data deriving section 610 stores such tables in form of data form.

In the flow chart of FIG. 6, following the above-mentioned step S202, LSI that may be a cause of the main breakdown, and the kind of the sub-data that should be gathered from the LSI are specified by referring to the above-mentioned tables (step S203).

When the LSI and the kind of the sub-data are specified, then, the data deriving section 610 of the monitoring apparatus 120 executes the sub-routine to perform gathering of the sub-data based on the specifying result (step S300). When the sub-routine is terminated, the processing is returned to the main routine shown in FIG. 5.

Hereinafter, there will be explained the sub-routine (step S300) to perform gathering of the sub-data.

Figure 7:
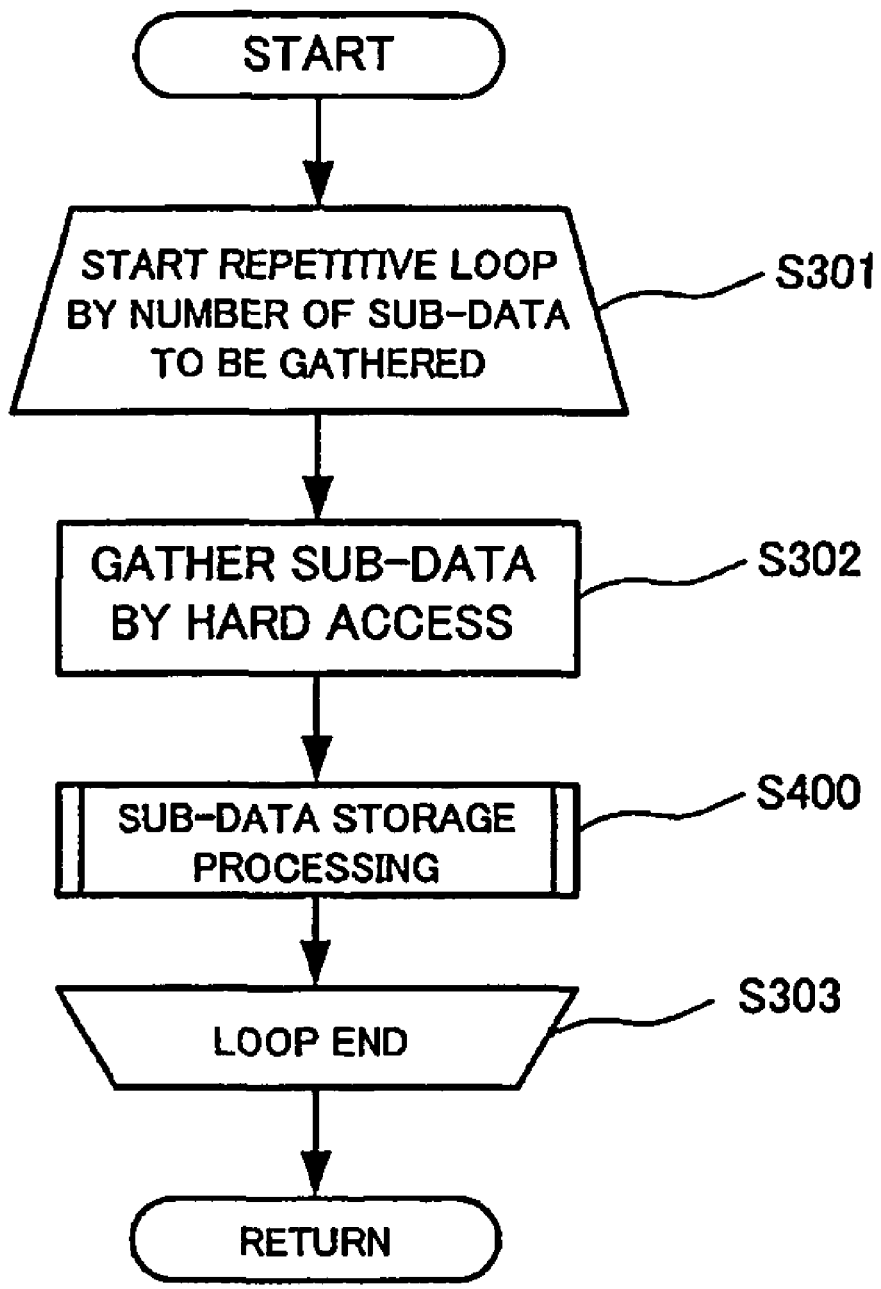
FIG. 7 is a flowchart of a subroutine which performs gathering of the sub-data.

FIG. 7 is a flowchart of a subroutine which performs gathering of the sub-data.

When the sub-routine starts, the repetitive loop for the following gathering processing of the number of sub-data that should be gathered worth is begun (step S301). For instance, regarding the breakdown state E1 of "CD Error", because eight sub-data in total are gathered from three LSI, the repetition loop eight times altogether is begun.

According to the present embodiment, a set of two or more pieces of sub-data which are gathered as to a certain breakdown state, for instance, eight pieces of sub-data which are gathered as to the breakdown state E1 of "CD Error", is treated as the state data representative of the state of the information processing apparatus 110 where the breakdown of the breakdown state occurs. The state data consisting of two or more pieces of sub-data corresponds to an example of the state data referred to in the present invention.

When the loop starts, an access to one of LSI's to be gathered is executed, so that a piece of sub-data of the sub-data to be gathered from the LSI is gathered (step S302).

When a piece of sub-data is gathered in the step S301, there is executed a sub-routine to perform processing for storage of the gathered sub-data into the memory 122 of the monitoring apparatus 120 (step S400).

When the piece of sub-data is stored in memory 122, the processing is returned via a loop end (step S301) to the step S301 to execute gathering (step S302) and storage (step S400) on the subsequent sub-data in a predetermined order of priority.

In the subroutine in FIG. 7, when gathering (step S302) and storage (step S400) are repeated by the number of sub-data that should be gathered, processing returns to the sub-routine shown in FIG. 6.

Next, there will be explained the sub-routine (step S400) of performing the processing for storage of one sub-data into the memory 122.

Figure 8:
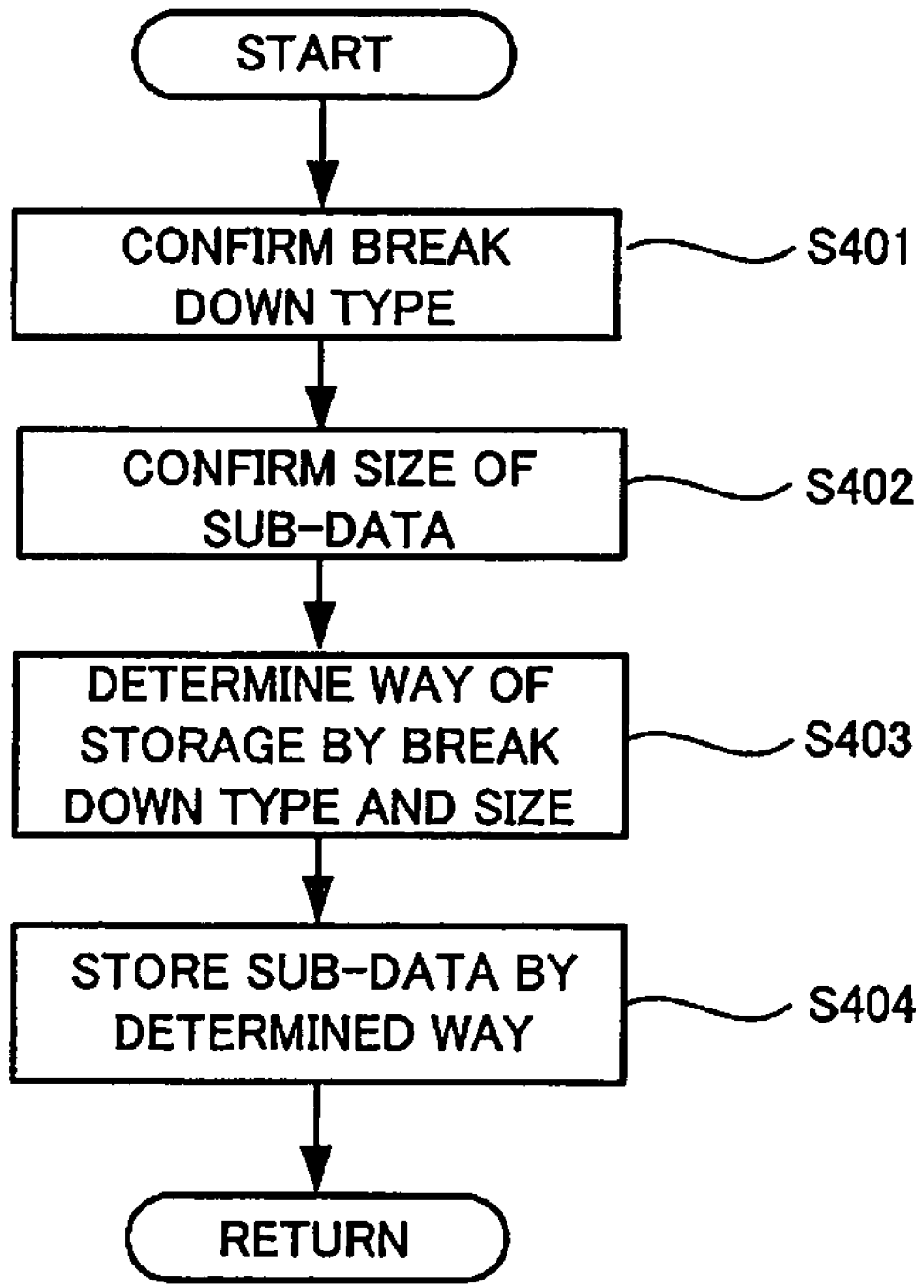
FIG. 8 is a flowchart of a subroutine which performs storage processing for one sub-data to a memory 122.

FIG. 8 is a flowchart of a subroutine which performs processing for storage of one sub-data into the memory 122.

when the sub-routine starts, first, it is confirmed which one of two breakdown types of the serious breakdown type and the negligible breakdown type is concerned with the type of the breakdown related to one sub-data to be stored (step S401). It is noted that this one sub-data is obtained through gathering as sub-data necessary for presenting the breakdown state specified in the step S201 of the flowchart of FIG. 6. That is, relations to the breakdown of what breakdown state of this one sub-data are already-known in the step S401. Thus, in the step S401, it is confirmed whether the already-known breakdown state belongs to Table 1 corresponding to the breakdown of the serious breakdown type or Table 2 corresponding to the breakdown of the negligible breakdown type.

Next, the data size of one sub-data to be stored is confirmed (step S402).

According to the present embodiment, it is understood that data sizes are either one of the following size on each the above-mentioned six kinds of sub-data gathered from each LSI.

With respect to the Major information J1, it is understood that it is either about 2 kilobytes, about 1 kilobyte or about 0.5 kilobytes. With respect to the Major information J2 too, it is understood that it is either one of those three kinds of size. With respect to the Allscan information J3, it is understood that it is either about 8 kilobytes, about 4 kilobyte, about 2 kilobytes, about 1 kilobyte or about 0.5 kilobytes. With respect to the Config information J5, it is understood that it is either about 4.4 kilobytes or about 0.7 kilobytes. Moreover, with respect to the History information J4 and the Analyze information J6, it is understood that they are one kind of size decided respectively almost.

In the step S402, it is confirmed that which size of the two or more kind of sizes as mentioned above is concerned with the data size of one sub-data to be stored.

Next, with respect to one sub-data to be stored, a way of storage to the memory 122 is determined in accordance with the breakdown type confirmed up to the step S402 as follows (step S403).

First, there will be explained an internal structure of the memory 122.

Figure 9:
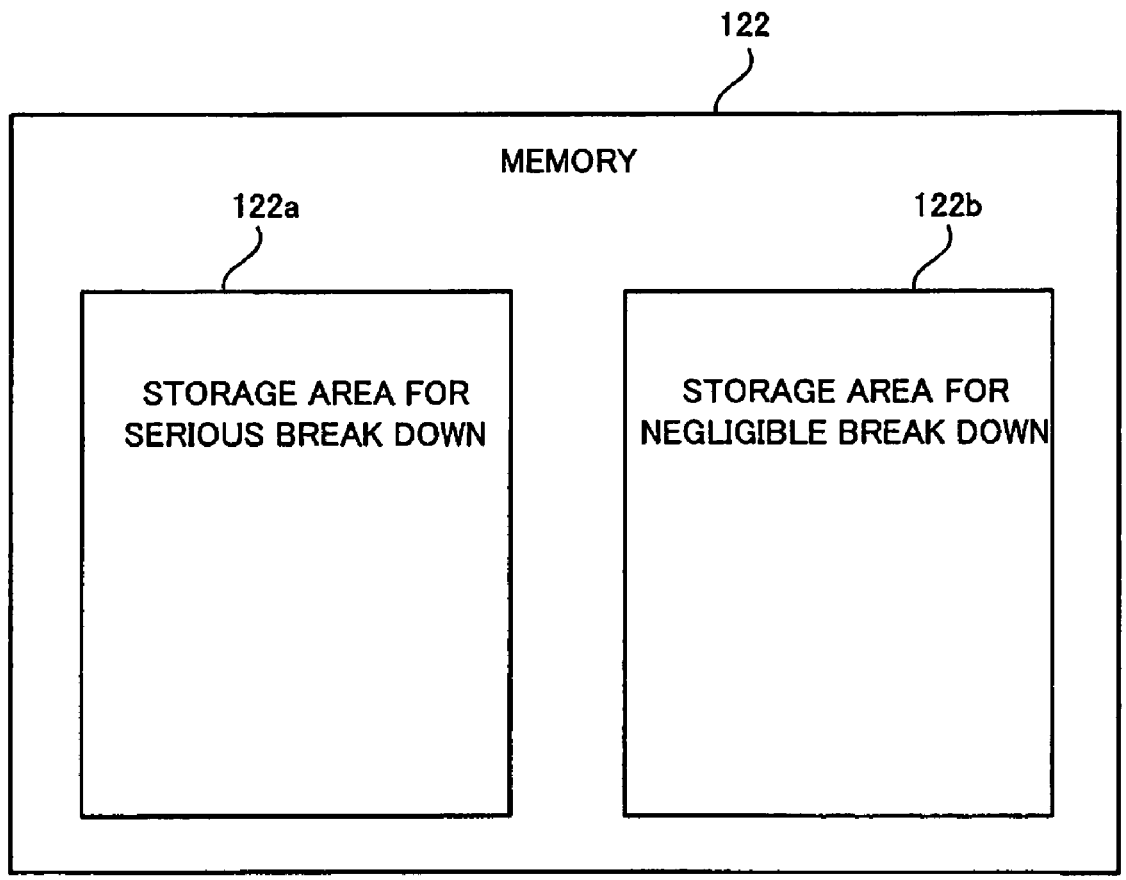
FIG. 9 is a typical illustration useful for understanding an internal structure of the memory 122.

FIG. 9 is a typical illustration useful for understanding an internal structure of the memory 122.

As shown in FIG. 9, the interior of the memory 122 consists of a storage area (a storage area for a serious breakdown) for sub-data (serious breakdown data) related to the breakdown of the serious breakdown type, and a storage area (a storage area for a negligible breakdown) for sub-data (negligible breakdown data) related to the breakdown of the negligible breakdown type. The internals of the storage area for a serious breakdown and the storage area for a negligible breakdown are subdivided, respectively as follows.

Figure 10:
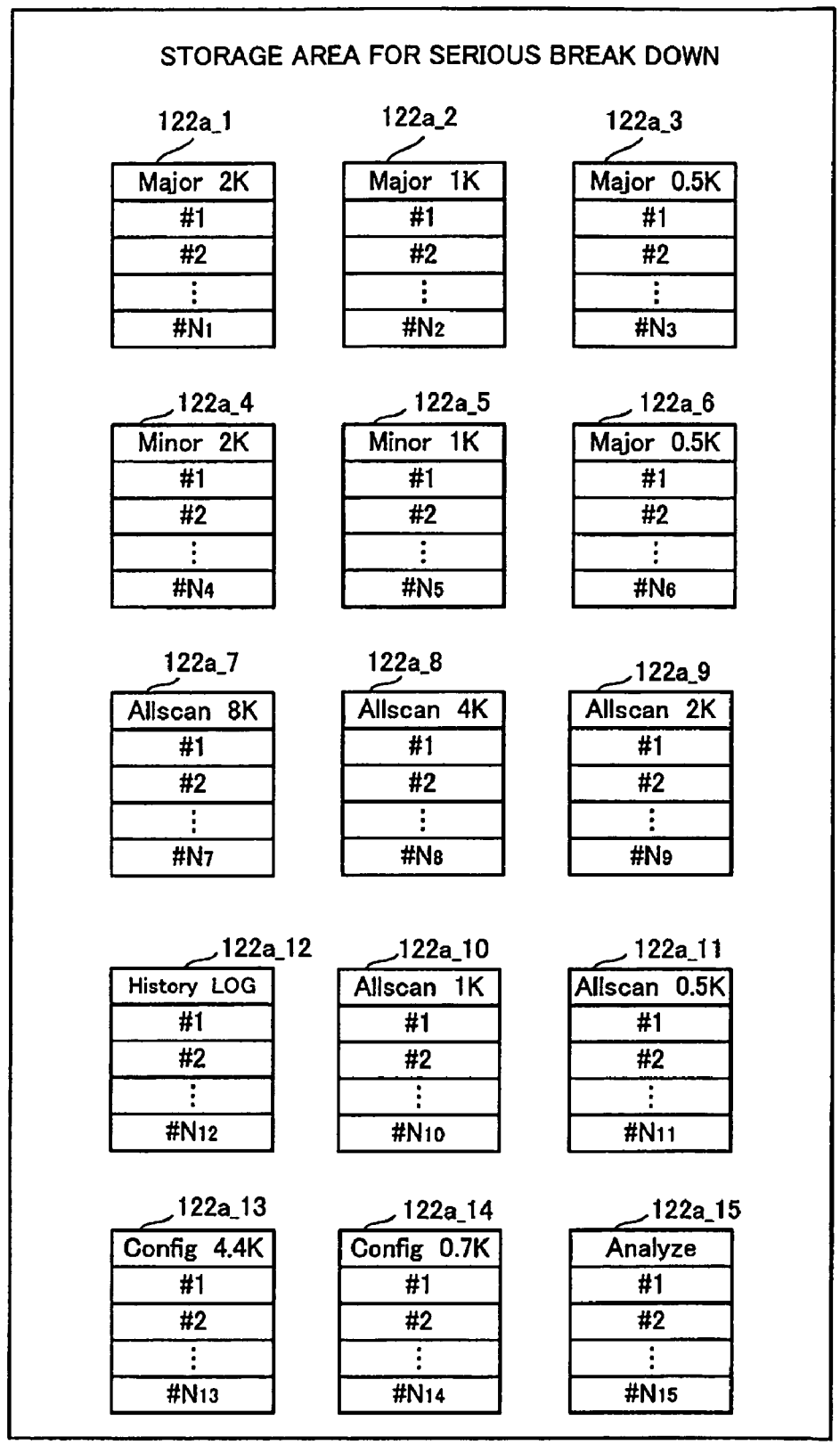
FIG. 10 is a typical illustration useful for understanding an internal structure of a storage area for serious breakdown shown in FIG. 9.
Figure 11:
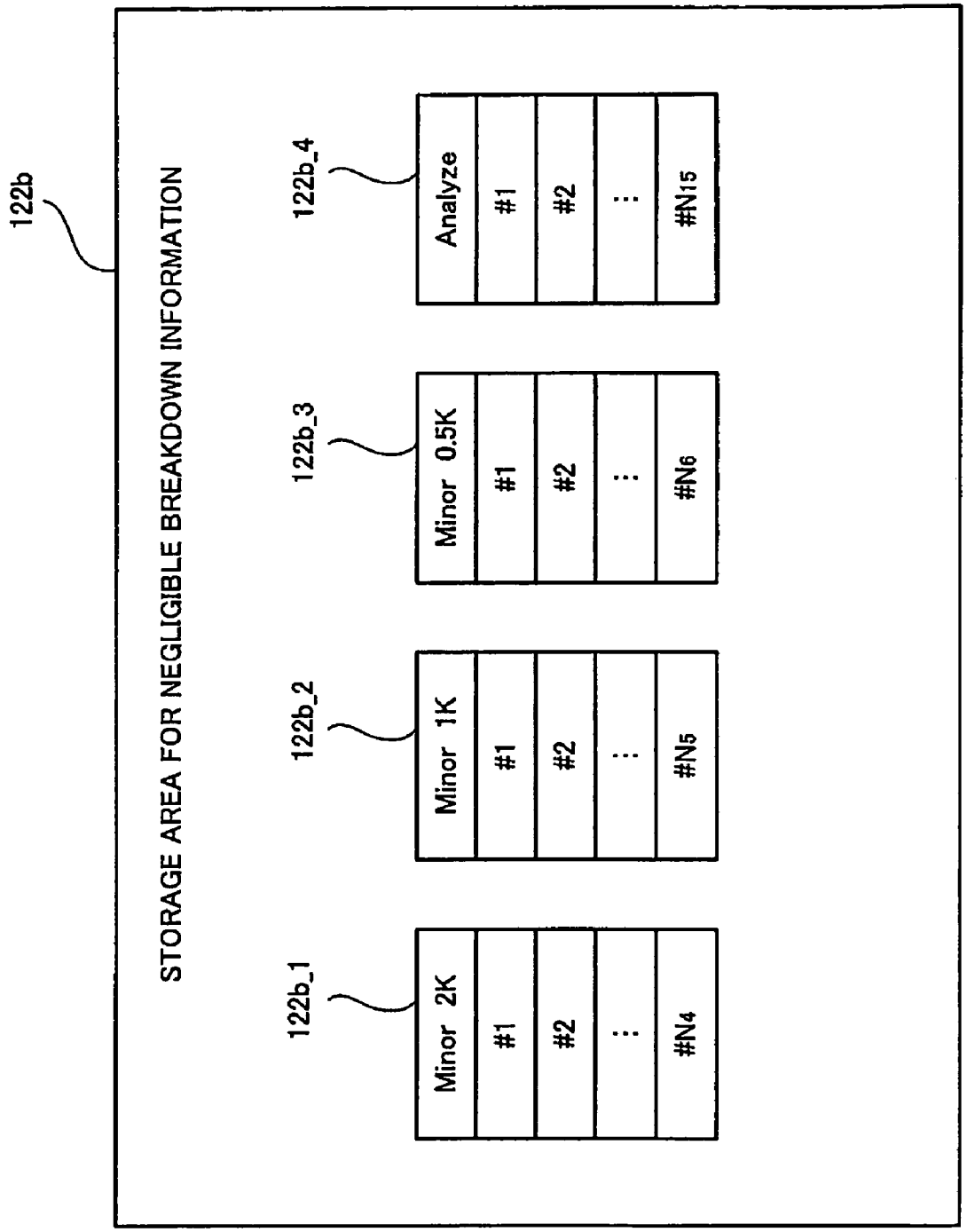
FIG. 11 is a typical illustration useful for understanding an internal structure of a storage area for negligible breakdown shown in FIG. 9.

FIG. 10 is a typical illustration useful for understanding an internal structure of a storage area for serious breakdown shown in FIG. 9. FIG. 11 is a typical illustration useful for understanding an internal structure of a storage area for negligible breakdown shown in FIG. 9.

A storage area 122a for a serious breakdown is subdivided into two or more storage sections as shown in FIG. 10. First, as sections for storing Major information, there are prepared Major 2K section 122a_1, Major 1K section 122a_2, and Major 0.5K section 122a_3 which store Major information of sizes of about 2 kilobytes, about 1 kilobyte, and about 0.5 kilobytes, respectively. As sections for storing Minor information, there are prepared Minor 2K section 122a_4, Minor 1K section 122a_5, and Minor 0.5K section 122a_6 which store Minor information of sizes of about 2 kilobytes, about 1 kilobyte, and about 0.5 kilobytes, respectively. As sections for storing Allscan information, there are prepared Allscan 8K section 122a_7, Allscan 4K section 122a_8, Allscan 2K section 122a_9, Allscan 1K section 122a_10, and Allscan 0.5K section 122a_11 which store Allscan information of sizes of about 8 kilobytes, about 4 kilobytes, about 2 kilobytes, about 1 kilobyte, and about 0.5 kilobytes, respectively. As sections for storing Config information, there are prepared Config 4.4K section 122a_13, and Config 0.7K section 122a_14 which store Config information of sizes of about 4.4 kilobytes, and about 0.7 kilobytes, respectively. As sections for storing History information and Analyze information, there are prepared History section 122a_12, and Analyze section 122a_15, respectively.

Moreover, as to 15 kinds of storage sections of the above-mentioned storage area 122a for a serious breakdown, for instance, Major 2K section 122a_1 is divided into $N_1$ pieces of division, and Major 1K section 122a_2 is divided into $N_2$ pieces of division. In such a manner, each of 15 kinds of storage sections of the above-mentioned storage area 122a is divided into two or more pieces of division each storing a piece of sub-data.

Here, for instance, a size of a piece of division of Major 2K section 122a_1 is about 2 kilobytes according to the size of Major information of about 2 kilobytes to be stored in the division. Moreover, for instance, a size of a piece of division of Allscan 8K section 122a_7 is about 8 kilobytes according to the size of Allscan information of about 8 kilobytes to be stored in the division. In this manner, according to the present embodiment, a size of a piece of division of individual storage section is a size according to the type of the associated storage section. In addition, the number of divisions that compose each storage section is also different depending on the kind of the storage section.

Divisions which compose each storage section are numbered as #1, #2, and #3 . . . #$N_1$. Sub-data that are gathered in the monitoring apparatus are stored in storage sections associated with kinds of the sub-data and data sizes in order of younger number of division.

On the other hand, as will be seen from Table 2, a storage area 122b for negligible breakdown stores sub-data that is gathered in the monitoring apparatus 122, which is concerned with two types of information of Major information and Analyze information. Accordingly, as seen from FIG. 11, the storage area 122b is provided with three types of storage sections 122b_1, 122b_2, and 122b_3 for Major information, and one type of storage section 122b_4. With respect to the structure of individual storage section, the redundant explanation will be omitted, since the same parts have been denoted by the same reference numbers as those of the storage area 122a for a serious breakdown shown in FIG. 10.

It returns to FIG. 8 and it keeps explaining. In the following explanations, it refers without especially noting drawing number for the components shown in each figure from FIG. 9 to FIG. 11.

As mentioned above, the processing of the step S403 determines the storage section of the memory 122 in accordance with the breakdown type of the breakdown involved in sub-data to be stored in the memory 122, and the data size of the sub-data.

For example, in the event that Major information, which is obtained from SC 111a on the breakdown state E1 of the above-mentioned "CD Error", is to be stored, the breakdown type of the breakdown involved in the Major information is the serious breakdown type since the breakdown state E1 of "CD Error" is described in Table 1. Thus, it is decided that the Major information is to be stored in the storage area 122a for a serious breakdown of the memory 122. Moreover, in event that the data size of the Major information is about two kilobytes for instance, it is decided in accordance with the data size that the Major information is to be stored in the Major 2K section 122a_1 of the storage area 122a for a serious breakdown.

Thus, when the storage section is decided, LOG-ID, which is numbered in the step S202 of the flowchart of FIG. 6, is given to the sub-data to be stored, and the sub-data provided with LOG-ID is stored in the decided storage section (step S404). Thereafter, the processing returns to the subroutine of FIG. 7.

In the subroutine of FIG. 7, gathering and storage of the sub-data are repeated by the number of sub-data to be gathered. The repetition makes it possible, with respect to a certain breakdown state, for instance, "CD Error" and "Minor Face", to gather and store the state data representative of the device state of the information processing apparatus 110 at the time when the breakdown of the breakdown state occurs in form of a set of two or more pieces of sub-data to which a common LOG-ID is given.

Since all two or more pieces of sub-data constituting one state data correspond to one breakdown state, those two or more pieces of sub-data are completely stored in either one of two storage areas shown in FIG. 9. It is noted that two or more pieces of sub-data are stored in the storage area with dispersion according to the data size of individual sub-data. However, those two or more pieces of sub-data are given with the common LOG-ID. Accordingly, even if two or more pieces of sub-data are stored in the storage area with dispersion, referring to the common LOG-ID makes it possible to understand that two or more pieces of sub-data constitute one state data.

According to the present embodiment as mentioned above, first of all, the state data consisting of two or more pieces of sub-data is stored in either one of two storage areas in accordance with whether the breakdown type of the breakdown involved in the state data is a serious breakdown type or a negligible breakdown type. This feature makes it possible to avoid a frequent overwriting by state data, which are obtained on the breakdown of the negligible breakdown type that occurs frequently as compared with state data which are obtained on the breakdown of the serious breakdown type. Accordingly, this feature makes it possible to enhance protection ability of the state data which are obtained on the breakdown of the serious breakdown type. Thus, according to the present embodiment, it is possible to discover with the greater accuracy the breakdown of the information processing apparatus in accordance with such state data when the maintenance and the like are performed in the future.

Further, according to the present embodiment, two or more pieces of sub-data constitute one state data are each stored in the storage section according to the data size of the sub-data, of the storage area. Thus, the above-mentioned storage area is effectively used in accordance with the data size of individual sub-data, and the generation of a useless unused area in the storage area is suppressed. This feature makes it possible to make the best use of the area of the storage area. The sub-data can be stored as a lot as possible and, consequently, the above-mentioned state data can be stored as a lot as possible. As a result, the frequency of the superscription generation in the storage area is suppressed. Accordingly, this feature makes it possible to more enhance protection ability of the state data in the storage area.

Incidentally, the breakdowns of the breakdown states shown in Table 1 and Table 2 might bring about vary in the occurrence of the breakdown owing to environments of use of the server system 100 and the manufacturing error margin etc. of LSI such as SC 111a and CPU 111c. The occurrence of such a variation enhances ratio in which specific kind of sub-data is gathered. As a result, it becomes easy for the storage section corresponding to the specific kind of sub-data in the memory 122 to be filled. Thus, the frequency of the superscription of the specific kind of sub-data rises. According to the present embodiment, in order to cope with such situations, there is provided a function of altering the size of a desired storage section in accordance with the user's operation. According to the present embodiment, the alteration section 640 has such a function.

Here, according to the present embodiment, as to the alteration of the size of the storage section, there is adopted a method in which because the storage capacity of the memory 122 is constant, for instance, when it is wished that the size of a desired storage section is increased, the size of other storage section is decreased properly, and the decreased amount is allocated to the desired storage section. According to the present embodiment, as seen from FIG. 4, an instruction of such a size alteration is performed via the terminal equipment (the personal computer 700 of the note type in an example of FIG. 4) which is connected to the alteration section 640.

First of all, a user inputs through an operating screen (not illustrated) displayed on the display screen of the personal computer 700 of the note type a new size, which is lager than the existing size, as to a desired storage section. With respect to other storage section, the user inputs a new size which is decreased by the correspondence on which a size of the desired storage section is increased. Then, the personal computer 700 of the note type transmits to the alteration section 640 a new size of individual one of those two storage sections and a section of size of individual storage section. The memory of the personal computer 700 of the note type previously stores a section of size of individual storage section of two or more storage sections shown in FIG. 10. Thus, the personal computer 700 of the note type transmits to the alteration section 640 a size of the storage section inputted by the user, and a section of size of storage section stored therein.

Hereafter, it keeps explaining the size change in the storage section referring to the concrete example.

Figure 12:
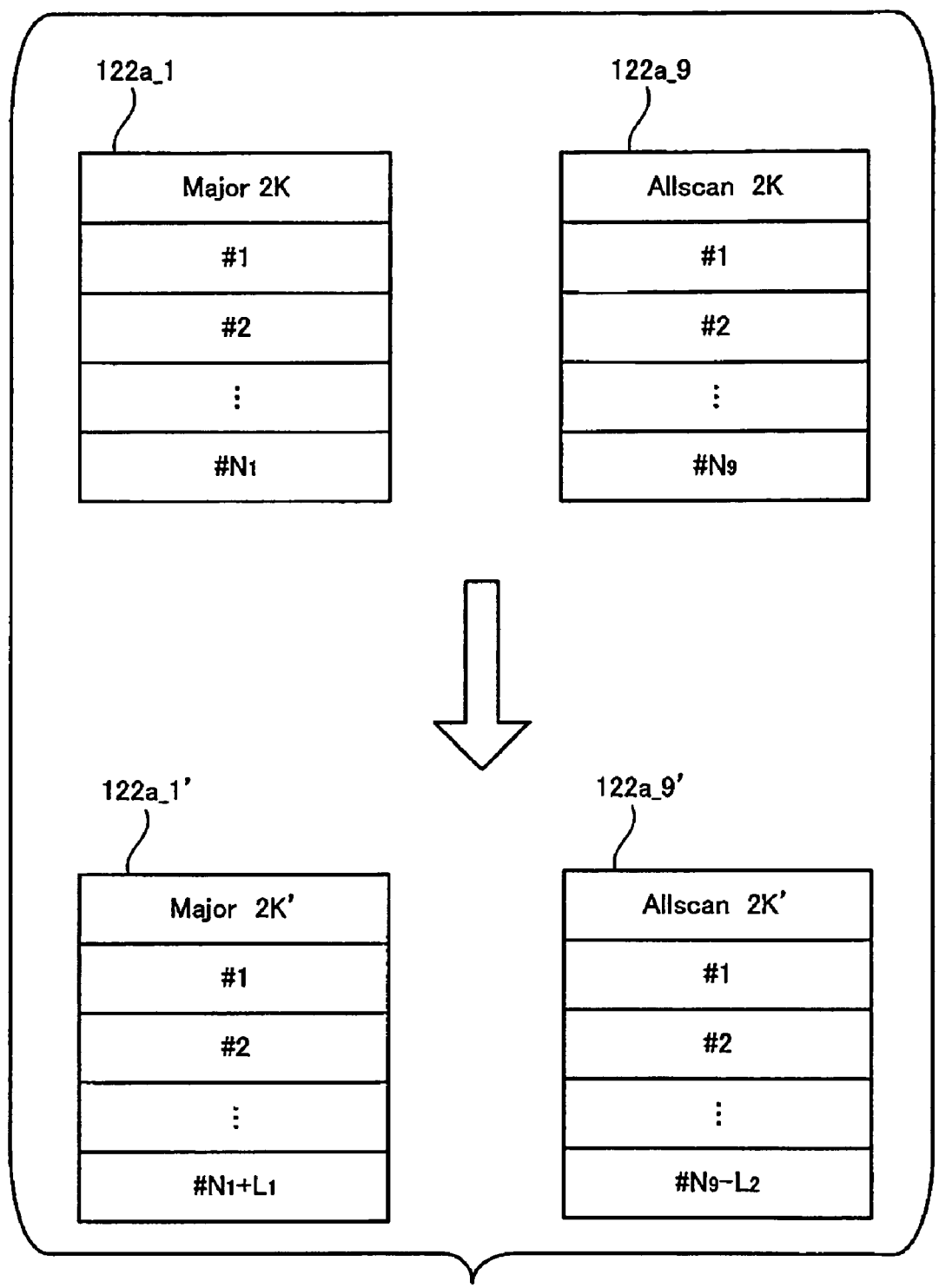
FIG. 12 is an illustration useful for understanding the situation in which the size of Major 2K part 122a_1 is increased, and the size of Allscan 2K part 122a_9 is decreased by just that much.

FIG. 12 is an illustration useful for understanding the situation in which the size of Major 2K section 122a_1 is increased, and the size of Allscan 2K section 122a_9 is decreased by just that much.

With respect to Major 2K section 122a_1, increment $L_1$ is expressed by the following equation. Where the size before the alteration is S1, the new size is S2 and a section of size Sa. The alteration of the size causes a number of sections of Major 2K section 122a_1 to increase by the increment $L_1$ expressed by the following equation.

$$L_1 = (S2 - S1)/Sa$$

On the other hand, with respect to Allscan 2K section 122a_9, increment $L_2$ is expressed by the following equation. Where the size before the alteration is S3, the new size is S4 and a section of size Sb. The alteration of the size causes a number of sections of Major 2K section 122a_1 to increase by the increment $L_2$ expressed by the following equation.

$$L_2=(S3-S4)/Sb=(S2-S1)/Sb$$

According to the present embodiment, such a size alteration increases the number of sections of a desired storage section, or the maximum storage number of the sub-data of the storage section. This feature causes the frequency of the superscription in the storage section to be lowered, and thus makes it possible to enhance protection ability of the sub-data in the storage section.

In the above description, there is explained an example in which a size of a desired storage section is increased by means of decreasing a size of other suitable storage section. According to the present embodiment, however, as an extreme example, for instance, it is also possible to add completely to a desired storage section the size that one storage section is lost and the storage section possesses.

Further, according to the present embodiment, it is acceptable to perform an operation that a storage section of size is reduced to provide a new storage section having the corresponding size. In this case, however, with respect to the new storage section, it is necessary for a user to input the size of the storage section and in addition a section of size of the storage section.

According to the present embodiment, as mentioned above, it is possible to avoid such an inconvenience that the serious breakdown data is lost through overwriting by the negligible breakdown data which is gathered frequently, and in addition to increase the size of the storage section to which sub-data intended in protection is stored, so that protection ability of the sub-data is enhanced.

According to the above description, as an embodiment of the information processing system of the present invention, there is disclosed the server system 100 which manages the client-server system in its entirety, and as an embodiment of the monitoring apparatus of the present invention, there is disclosed the monitoring apparatus 120 that monitors the operation of the information processing apparatus 110 having the management function for the client-server system in the server system 100. However, the present invention is not restricted to those embodiments. Any one is acceptable, as an information processing system of the present invention, which comprises some information processing apparatus and a monitoring apparatus that observes the operation of the information processing apparatus. And, any one is acceptable, as a monitoring apparatus of the present invention, which observes the operation of some information processing apparatus.

Moreover, according to the embodiment of the present invention as mentioned above, as one example of the data deriving section referred to the present invention, there is raised the data deriving section 610 that gathers sub-data through accessing to seven kinds of LSI shown in FIG. 2. However, the present invention is not restricted to this embodiment. It is acceptable that the data deriving section referred to the present invention gathers sub-data through accessing to other LSI than those seven kinds of LSI.

Moreover, according to the embodiment of the present invention as mentioned above, as one example of the data deriving section referred to the present invention, there is raised the data deriving section 610 that gathers six kinds of sub-data shown in Table 1 and Table 2. However, the present invention is not restricted to this embodiment. It is acceptable that the data deriving section referred to the present invention gathers sub-data other sub-data than those six kinds of sub-data.

Moreover, according to the embodiment of the present invention as mentioned above, as one example of the data storage section referred to the present invention, there is raised the data storage section 630 that stores two or more sub-data constituting a piece of state data in a storage area according to the breakdown type of the associated breakdown through dispersion according to the data size of the individual sub-data. However, the present invention is not restricted to this embodiment. It is acceptable that the data storage section referred to the present invention stores two or more sub-data constituting a piece of state data in one section of a storage area according to the breakdown type of the associated breakdown on a batch basis.

The invention claimed is:

1. A monitoring apparatus that monitors operations of an information processing apparatus that notifies occurrence of breakdown which occurs during execution of a predetermined information processing operation, the monitoring apparatus comprising:
   a memory section that includes two or more storage areas each of which includes two or more storage sections corresponding to data sizes different from one another, the two or more storage areas being arranged to be associated with each of two or more breakdown types which are mutually different in seriousness of breakdown;
   a data deriving section that derives from the information processing apparatus state data representative of an apparatus state of the information processing apparatus, when the data deriving section receives a notification of occurrence of a breakdown by the information processing apparatus;
   a breakdown classification section that classifies the breakdown associated with the notification into a breakdown type corresponding to a seriousness of the notified breakdown; and
   a data storage section that stores the state data derived by the data deriving section in a storage section corresponding to a data size of the derived state data in a storage area corresponding to the breakdown type classified by the breakdown classification section, of the two or more storage areas.

2. The monitoring apparatus according to claim 1, wherein the data deriving section derives from the information processing apparatus two or more pieces of sub-data each representing a component state of two or more components constituting the information processing apparatus respectively, as the state data, and
   the data storage section stores each of the sub-data constituting the state data in a storage section corresponding to each datum size of the sub-data, of two or more storage sections each associated with data sizes different from one another in the storage area, when the data storage section stores the state data in the storage area.

3. The monitoring apparatus according to claim 2, wherein the monitoring apparatus further comprises an alteration section that alters an area of the storage section and alters a maximum storage number of the state data in the storage section.

4. The monitoring apparatus according to claim 1, wherein the monitoring apparatus further comprises an alteration section that alters an area of the storage section and alters a maximum storage number of the state data in the storage section.

5. A computer-readable storage medium storing a monitoring program that is incorporated in a computer to be executed in the computer, the monitoring program causing the computer to monitor operations of an information processing apparatus that notifies occurrence of breakdown which occurs during execution of a predetermined information processing operation, wherein the monitoring program constitutes in the computer:

a data deriving section that derives from the information processing apparatus state data representative of an apparatus state of the information processing apparatus, when the data deriving section receives a notification of occurrence of a breakdown by the information processing apparatus;

a breakdown classification section that classifies the breakdown associated with the notification into a breakdown type corresponding to the notified seriousness, of two or more breakdown types that are mutually different in seriousness of breakdown; and a data storage section that stores the state data derived from the data deriving section, of two or more storage areas which is included in a memory section and each of which includes two or more storage sections corresponding to data sizes different from one another, the two or more storage areas being arranged to be associated with each of two or more breakdown types which are mutually different in seriousness of breakdown, in a storage section corresponding to a data size of the derived state data in a storage area corresponding to the breakdown type classified by the breakdown classification section, of two or more storage areas.

6. An information processing system comprising:

an information processing apparatus that notifies occurrence of breakdown which occurs during execution of a predetermined information processing operation; and a monitoring apparatus including:

a data deriving section that derives from the information processing apparatus state data representative of an apparatus state of the information processing apparatus, when the data deriving section receives a notification of occurrence of a breakdown from the information processing apparatus;

a memory section that includes two or more storage areas each of which includes two or more storage sections corresponding to data sizes different from one another, the two or more storage areas being arranged to be associated with each of two or more breakdown types which are mutually different in seriousness of breakdown;

a breakdown classification section that classifies the breakdown associated with the notification into a breakdown type corresponding to a seriousness of the notified breakdown; and a data storage section that stores the state data derived from the data deriving section in a storage section corresponding to a data size of the derived state data in a storage area corresponding to the breakdown type classified by the breakdown classification section, of the two or more storage areas.

* * * * *